United States Patent Office 3,347,872
Patented Oct. 17, 1967

3,347,872
DERIVATIVES OF FURAN
Anthony J. Passannante, Metuchen, John R. Lovett, Edison, and Perry A. Argabright, Cranford, N.J., assignors to Esso Research and Engineering Company, a corporation of Delaware
No Drawing. Filed Dec. 21, 1960, Ser. No. 77,462
13 Claims. (Cl. 260—347.3)

This invention relates to a difluoramino ($NF_2$) adduct of furan which is monosubstituted by a functional group, particularly a functional group that contains carbon linked by a double bond to a hetero atom, such as oxygen or nitrogen and which is reactive with another functional group, such as a hydroxy group, by condensation or addition to form a linkage such as an ester linkage.

Furan derivatives containing a high ratio of $NF_2$ groups linked to carbons in the furan nucleus are good as oxidizer components for high-energy compositions useful as rocket propellants. The functional group in these derivatives makes them valuable reactive intermediates.

The furan nucleus of the compound furan can be remarkably well loaded with $NF_2$ groups and then be stable as taught in the U.S. Application Ser. No. 77,471, filed by Perry A. Argabright on Dec. 21, 1960, now abandoned.

In accordance with the present invention, the $NF_2$ loading of a furan derivative having a monofunctional group linked to one carbon in the nucleus is accomplished without adverse effects by or on the functional group.

Functional groups of particular interest in the furan derivatives are those capable of reacting with a hydroxy group to obtain an ester or similar linking of the $NF_2$ loaded furan to another molecule.

Preferred functional groups are the following:

| Carbomethoxy | $-\overset{O}{\overset{\|}{C}}-OCH_3$ |
| Carbonyl halide | $-\overset{O}{\overset{\|}{C}}-Cl$ |
| Isocyanate | $-N=C=O$ |
| Carboxy | $-\overset{O}{\overset{\|}{C}}-OH$ |
| Carboxaldehyde | $-\overset{O}{\overset{\|}{C}}-H$ |
| Carbonitrile | $-C \equiv N$ |

Any of such functional groups (denoted as X) is monosubstituted for one hydrogen atom attached to a carbon atom in the ring nucleus of furan, as in the following structural formulae:

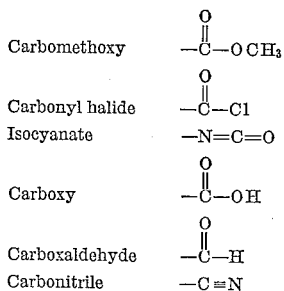

I  II  III

Formulae I and II illustrate different position isomers monosubstituted by the functional group X. Formula III is a generalized formula for the isomers, denoting that X is attached to any of the carbon atoms in place of a hydrogen atom.

Techniques useful in the reaction of furan with $N_2F_4$ can be applied to the reaction of monofunctional furan derivatives with excess $N_2F_4$, but preferably with modifications depending on differences in reactivity. Thus, in general, suitable conditions for these reactions are: reaction temperatures in the range of about 100° C. to about 450° C., pressures in the range of 5 to 3000 p.s.i.a., residence times of 0.1 to about 24 hours or less, and about 2 to 10 moles or more of $N_2F_4$ per mole of furan derivative. However, a monofunctional group makes the addition and even substitution of $NF_2$ for hydrogen go more easily and completely at temperatures in the range of about 100° to 250° C. and under reduced pressure in the range of about 5 to 14.7 p.s.i.a. to obtain a product in which there is at least 1 $NF_2$ group attached per carbon atom in the nucleus, or 4 to 6 $NF_2$ groups ($y=4$ to 6) as in the following tetrakis $NF_2$ and generalized formulae:

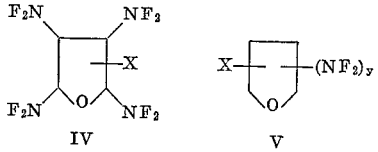

IV  V

The peculiar ease of preparing the tetrakis $NF_2$ adducts of monofunctional furans is advantageous for eliminating steps of separating lower $NF_2$ adducts which have less energy value. Furan, itself, has been found more difficult to react with $N_2F_4$ to the extent that with formation of the tetrakis ($NF_2$) adduct of furan a substantial amount of bis-adduct is obtained.

Details on the preparation of $NF_2$-loaded monofunctional furan derivatives are given in the following examples.

*Example 1.—Furoyl chloride ($NF_2$) adduct*

0.5 cc. (0.69 g.; 0.0053 mole) of furoyl chloride $C_4H_3O(COCl)$ was injected into a one-liter glass bulb. This bulb was then cooled and evacuated to remove any air, but no furoyl chloride. The bulb was then enclosed in a heating mantle and attached to a manometer. The total reaction zone volume of the evacuated system was approximately 1100 cc. To this system was charged 2.91 g. (0.028 mole) of $N_2F_4$. The reaction mixture of furoyl chloride and $N_2F_4$ was heated for 5 hours at 150° C. The $N_2F_4$ take-up amounted to approximately 1 g. Distillation of the product yielded 1.5 g. of tetrakis $NF_2$ adduct (yield: 83% based on furoyl chloride).

Analysis showed that the product contained as much or more $NF_2$ as needed for the composition $$C_4H_3O(NF_2)_4COCl.$$

*Analysis.*—Tetrakis $NF_2$ adduct calculated: N, 16.5%; F, 44.9%; Cl, 10.5%. Found: N, 17.2%; F, 45.6%; Cl, 10.8%.

The reaction has been found to be quite reproducible at preferred reaction temperatures in the range of 100° C. to 250° C. Adequate purification was accomplished by bulb to bulb distillation. Further identification of the product is based on infrared (I.R.) nuclear magnetic resonance (N.M.R.) and gas chromatography (G.C.) determinations, all of which indicate that the product contained at least 4 $NF_2$ groups per molecule and a structure consistent with that assigned.

*Example 2.—Methyl furoate ($NF_2$) adduct*

0.63 g. (0.005 mole) of distilled methyl furoate $$C_4H_3O(COOCH_3)$$

was injected into a one-liter bulb. The bulb was then cooled. Air was evacuated from the bulb, which with its contents of methyl furoate was enclosed in a heating mantle and attached to a manometer. To the evacuated bulb system having a total volume of 1100 cc. was charged 0.0216 mole $N_2F_2$. The mixture in the bulb was heated for 6 hours at 150° C. The $N_2F_4$ take-up was approximately 0.8 g. and distillation of the product yielded 0.98 g. of tetrakis $NF_2$ adduct (yield: 60% based on methyl furoate). Elemental analysis: Presence of more than enough $NF_2$ in product needed for tetrakis $NF_2$ adduct of methyl furoate having the composition $$C_4H_3O(NF_2)_4COOCH_3$$

*Analysis.*—Tetrakis adduct calculated: N, 16.8%; F, 45.5%. Found: N, 17.8%; F, 45.5%.

Preferred reaction temperatures for the reaction of methyl furoate with $N_2F_4$ are in the range of about 100° C. to 250° C. Repeated tests showed the reaction to be quite reproducible. Characterization of the product based on I.R., G.C., N.M.R. and elemental analysis confirmed the structure.

The described conditions of Examples 1 and 2 were not optimum for obtaining the tetra adducts of other monofunctional furan derivatives. The furyl isocyanate —$N_2F_4$ reaction product made by heating from 4 to 5 moles $N_2F_4$ per mole of furyl isocyanate at below 150° C. for from 4–18 hours contained appreciable amounts of unsaturated materials, probably bis isomers. Furfural heated with $N_2F_4$ at 100° C. (1 to 5 molar ratio) for 4 hours gave a tar which analyzed for the bis ($NF_2$) adduct, $$C_4H_3O(NF_2)_2CHO$$

However, conditions have been found which allow the preparation of tetrakis ($NF_2$) adducts and derivatives of higher ($NF_2$) contents. The conditions which work for furyl isocyanate are short contact of 1–60 minutes at 250° C. in the presence of large excesses of $N_2F_4$ (mole ratios from 4–8 moles of $N_2F_4$ to 1 of furyl isocyanate). Tetrakis furfural can be prepared, on the other hand, in solution by contacting furfural with $N_2F_4$ under pressure for long times 5 hours at room temperature to 150° C. Attempts to add $N_2F_4$ to furfural at subatmospheric pressure in glass resulted, as mentioned, at low temperatures in tar formation. In glass, using the conditions suitable for preparation of the furyl isocyanate tetra adduct (high temperature, short contact), hydrogen replacement in the aldehydic functional group was observed and no tetra furfural adduct was obtained.

Details on the preparation of tetrakis or higher furyl isocyanate and tetrakis furfural follow:

*Example 3.—Tetrakis ($NF_2$) furyl isocyanate*

0.25 cc. of furyl isocyanate (0.234 g.) was injected into a one-liter glass bulb. This bulb was cooled and evacuated to remove any air but no furyl isocyanate. The bulb was then enclosed in a heating mantle and attached to a manometer. Total volume was the same as in Example 1. To this system was charged 1.25 g. (.012 mole) of $N_2F_4$. The reaction mixture of furyl isocyanate and $N_2F_4$ was heated quickly (in 20 minutes) to 250° C. and maintained at temperature for 15 minutes. Distillation of the product gave 0.26 g. of tetrakis $NF_2$ adduct (yield: 40% based on furyl isocyanate).

Analysis showed that the product contained as much or more $NF_2$ as needed for the composition

$$C_4H_3O(NF_2)_4NCO$$

*Analysis.*—Tetrakis theory: N, 22.08%; F, 47.95%; H, 0.95%. Found: N, 21.94%; F, 47.70%; H, 0.95%.

Preferred reaction conditions for furyl isocyanate for preparing tetrakis are temperatures in the range of about 150° to 350° C. with short contact times in the range of 1 to 60 minutes.

*Example 4.—Pentakis ($NF_2$) furyl isocyanate*

0.224 g. (0.00207 mole) furyl isocyanate was pressured with 282 mm. Hg $N_2F_4$ (0.0165 mole). The mixture was heated to 250° C. for 20 minutes, then held 30 minutes at this temperature in a one-liter glass bulb. The cooled product was distilled through a series of traps to yield 0.117 g. of product in a wet ice cooled trap and 0.041 g. of adduct in a Dry Ice cooled trap. I.R., G.C. and elemental analysis showed product collected in wet ice trap contained mainly pentakis ($NF_2$) furyl isocyanate.

*Analysis.*—Found: N, 23.2% (average); F, 51.8%. Theory (tetrakis): N, 22.08%; F, 47.95%. Theory (pentakis): N, 22.75%; F, 51.5%.

The production of pentakis ($NF_2$) furyl isocyanate, $C_4H_2O(NF_2)_5NCO$ was confirmed.

*Example 5.—Hexakis ($NF_2$) furyl isocyanate*

0.249 g. (0.0022 mole) furyl isocyanate was heated with 0.0181 mole $N_2F_4$ to 250° C. for 20 minutes, then held at this temperature 60 minutes. A yield of 0.069 g. wet ice trap product was obtained. G.C. indicated a high purity major peak area of material having hexakis elemental analysis of composition $C_4HO(NF_2)_6NCO$.

*Analysis.*—Found: N, 23.4%; F, 52.3%. Theory (hexakis): N, 23.3%; F, 54.2%.

*Example 6.—Tetrakis furfural adduct*

0.25 cc. of furfural was dissolved in 2 cc. of $CCl_4$ contained in a 10 cc. steel bomb. $N_2F_4$ (0.013 mole) 1.35 g. was condensed into the bomb and it was closed. The reaction mixture was then heated at 100° C. during 18 hours. Removal of the $N_2F_4$ and solvent left a heavy liquid which was distilled to give 0.330 g. of product. This analyzed for a mixture of predominantly tetrakis adduct of composition $C_4H_3O(NF_2)_4CHO$.

*Analysis.*—Found: N, 16.72%; F, 45.7%, 47.1%; (1.7%). Theory (tetra): N, 18.4%; F, 50.0%; (1.32%). Theory (bis): N, 14.0%; F, 38.0%; (2.0%). Gas chromatography—2 peaks of approximately equal intensity. I.R.—Consistent with mixture of normal bis and tetra adducts.

Preferred reaction conditions for furfural with excess $N_2F_4$ are superatmospheric pressures, e.g., in the range of about 20 to 3000 p.s.i.g., for contact times of about 1 to 24 hours, and at temperatures in the range of about 20° to 200° C.

The $NF_2$ adducts of the furan derivatives which contain the reactive functional groups, as a class, are fairly good $NF_2$ oxidizers in that they contain at least 4 $NF_2$ groups per 5 to 6 carbon atoms in the molecule, but they have even more significant value as intermediate reactants in making polymer binders and other compounds of increased energy values.

A polymer, such as polyvinyl alcohol, contains a number ($n$) of recurring units bearing a hydroxy group characterized as follows:

$$(-CH_2-CH-)_n$$
$$\phantom{xxxxx}|$$
$$\phantom{xxxxx}OH$$

By reacting polyvinyl alcohol with an $NF_2$ adduct of furoyl chloride, of methyl furoate, or of furyl isocyanate, such adduct containing the number ($y$) of $NF_2$ groups, the following kinds of modified polymers are obtained:

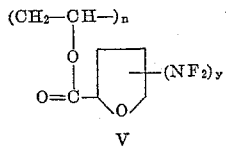 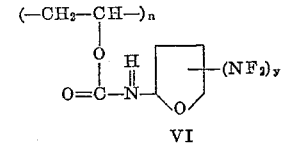

V        VI

Modified polymers of the above Types V and VI have been synthesized. In these the multi $NF_2$ loaded furan is linked by an ester group (carboxylic or carbamic) to the hydrocarbon chain of the polymer which may contain 10 to 10,000 or more recurring units. In the units shown, for $y=4$ to 6, the unit contains 4 to 6 $NF_2$ groups for 7 carbon atoms.

Lower molecular weight compounds containing a hydroxy group also react with the $NF_2$ loaded furan derivatives, e.g. trinitroethanol, to obtain a mixed polynitrodifluoramino oxidizer.

A technique for reacting the $NF_2$-furan derivatives with polyvinyl alcohol is described and claimed in U.S. application Ser. No. 77,463 (IN–48) of A. J. Passannante filed Dec. 21, 1960. This method involves use of a liquid organic diluent, e.g. nitrobenzene, acetonitrile, or tetrahydrofuran which solvates polyvinyl alcohol, and reacting the polymer thus solvated with excess proportion of the isocyanate adduct at about 20° to 100° C. The resulting modified polymer (V or VI) then can be used in proportions of up to 30 wt. percent as binder with liquid NF₂ oxidizer (tetrakis NF₂ butane), oxygen oxidizer (hexanitroethane) and powdered boron to make up solid composites having specific impulses ratings of 270 to 290.

A procedure for reaction with lower molecular weight alcohols, e.g. trinitroethanol as shown and claimed in U.S. application Ser. No. 77,464 (Case IN-62) of A. J. Passannante, filed Dec. 21, 1960, involves reaction of the alcohol in excess with the NF₂ adduct of the compound having a functional group, e.g. isocyanate at 0° to 50° C. and recovery of product by precipitation from solution.

U.S. application Ser. No. 77,465 of J. R. Michael et al., filed Dec. 21, 1960, is concerned with NF₂ adducts of bifunctional furan derivatives which, in general, are made by reaction of bifunctional furan derivatives with N₂F₄ under superatmospheric pressure with the aid of a solvent.

What is claimed is:

1. NF₂ adduct of furan containing a functional substituent as in the formula:

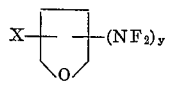

wherein X is a monofunctional group of the class consisting of carbomethoxy, carbonyl halide, isocyanate, carboxy, carboxaldehyde and carbonitrile linked to a carbon atom in the furan nucleus and $y$ indicating the number 4 to 6 of NF₂ groups linked to carbon atoms in said nucleus.

2. Tetrakis (NF₂) furoyl chloride.
3. Tetrakis (NF₂) methyl furoate.
4. Tetrakis (NF₂) furyl isocyanate.
5. Tetrakis (NF₂) furfural.
6. Pentakis (NF₂) furyl isocyanate.
7. Hexakis (NF₂) furyl isocyanate.
8. Tetrakis (NF₂) adduct of furoic acid.
9. Process for preparing a furan derivative having an NF₂ group attached to each carbon atom of a furan nucleus and having a single functional substituent group attached to a carbon atom in the furan nucleus, which comprises reacting furan monosubstituted by a single functional group attached to a carbon atom in the furan nucleus with excess N₂F₄ at a reaction temperature in the range of about 100° to 400° C., said functional group being selected from the class consisting of carbomethoxy, carbonyl halide, isocyanate, carboxy, carboxaldehyde, and carbonitrile functional groups, and recovering resulting tetrakis (NF₂) adduct of the furan having the functional group substituent.

10. Process as in claim 9, in which the substituted furan reacted with N₂F₄ is furyl isocyanate and the reaction temperature is in the range of 150° to 350° C. to obtain from 4 to 6 NF₂ groups attached to the carbon atoms of the furan nucleus.

11. Process as in claim 9, in which the substituted furan reacted with N₂F₄ is methyl furoate and the reaction temperature is in the range of 100° to 250° C.

12. Process as in claim 9, in which the substituted furan reacted with N₂F₄ is furoyl chloride and the reaction temperature is in the range of 100° to 250° C.

13. Method for preparing tetrakis (NF₂) furfural which comprises, reacting furfural with excess N₂F₄ under superatmospheric pressure at a temperature in the range of about 20° to 200° C. for a period to form tetrakis (NF₂) furfural as product and recovering said product.

References Cited

Hoffman et al., Chemical Reviews, vol. 62 pages 1–18 (1962).

Banks, Fluorocarbons and Their Derivatives, pages 82 to 91 (1964).

NICHOLAS S. RIZZIO, *Primary Examiner.*

L. D. ROSDOL, *Examiner.*

J. W. WHISLER, *Assistant Examiner.*